March 19, 1968    H. J. CHABBERT    3,373,498
MAGNETIC COMPASS
Filed June 7, 1966
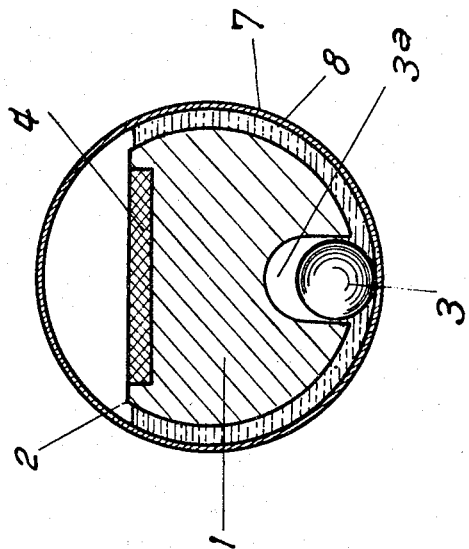
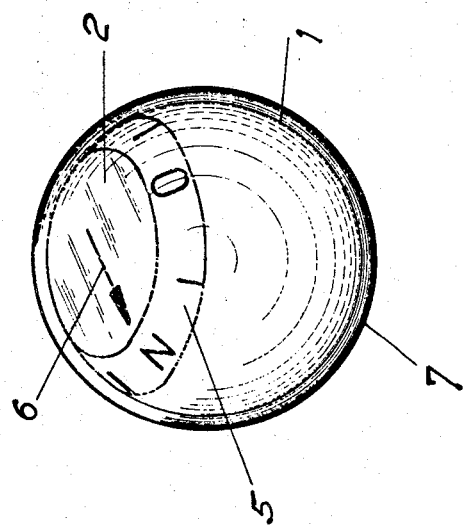
INVENTOR
HENRI JULES CHABBERT
BY Woodhams, Blanchard & Flynn
ATTORNEYS

United States Patent Office 3,373,498
Patented Mar. 19, 1968

3,373,498
MAGNETIC COMPASS
Henri Jules Chabbert, "Lacasanous," Ave. d'Attigny,
Pau, Basses-Pyrenees, France
Filed June 7, 1966, Ser. No. 555,804
Claims priority, application France, June 11, 1965,
20,527, Patent 1,464,612
3 Claims. (Cl. 33—223)

ABSTRACT OF THE DISCLOSURE

A compass housing contains a fluid buoyantly supporting a spherical float. A segment of the float is removed so as to form a flat surface having a magnetic rod fixed secured thereto. The float also has a recess located diametrically opposite the magnetic rod. A guide ball is rotatably received within the recess and projects therefrom so that it rollingly engages the internal spherical surface of the housing. Gravity tends to maintain the guide ball in the lowermost position within the housing and thus to maintain the flat surface of the float substantially horizontal.

---

This invention relates to a magnetic compass which is of extremely simple design and very inexpensive to produce, which cannot get out of order and operates in any position.

A magnetic compass in accordance with the invention comprises in combination a float, a magnetized rod which is rigidly fixed to said float, a transparent outer chamber which freely surrounds the float, a free ball which is associated with said float and which is adapted to run on the internal surface of the outer chamber and a fluid which is introduced within said chamber, the quantity of fluid being sufficient to ensure that the float floats freely within the outer chamber.

The float can have any shape which can preferably be inscribed within a sphere but is advantageously given the shape of a solid of revolution such as a sphere, or a sphere from which a segment has been cut off, or the shape of a cone or cone frustum having either a flat base or a base formed by the segment of a sphere or of a spheroid; as will become apparent from the remainder of the description, said float could also have the shape of a pyramid or pyramid frustum.

The outer chamber can also have any shape which may be desired, the essential condition being that the dimensions of said chamber with respect to those of the float are such that this latter is permitted to take up freely any orientation with respect to the outer chamber.

The four cardinal points, as well as the intermediate or collateral points if necessary, are marked on the outer surface of the float.

Other properties and advantages of the invention will become readily apparent from the following description, reference being had to the accompanying drawings, in which:

FIG. 1 is an external view of a magnetic compass in accordance with the invention; and FIG. 2 is a transverse sectional view of said compass.

In the mode of construction which is illustrated by way of example, the compass comprises a float member 1. Said float is constituted in this example by a sphere from which a segment has been cut off in such a manner that said float presents a flat surface 2 at the top. Said float 1 is shown as solid but may be hollow and is associated with a ball 3 which is freely engaged in a recess 3a formed in the float 1 in such a manner that the surface 2 is substantially horizontal. Provision is also made in said float for a magnetized rod 4, for example in the form of a needle of large diameter, which is secured to said float by any known means, for example by bonding.

In particular, the float 1 can be formed in two parts which are joined together by welding or bonding after introduction of the ball 3 and fixing of the magnetized rod 4.

As can be seen more readily from FIG. 1, provision is made on the outer face of the float 1 and in the vicinity of the flat face 2 for an annular dial 5 on which are marked the cardinal points as well as the intermediate or so-called collateral points if so required. Finally, an arrow 6 indicating the north point is marked on the plane face 2.

Said float 1 is introduced into an outer chamber or housing 7 which, in the example shown, is of spherical shape and formed of a transparent material such as glass, plastic material and the like.

The internal diameter of said sphere 7 is slightly larger than the external diameter of the sphere 1. Said sphere 1 can therefore take up all conceivable orientations with respect to the sphere 7 and can in particular retain the same vertical orientation, that is to say in which the ball 3 is located at the bottom and the flat surface 2 is horizontal, irrespective of the movements imparted to the outer sphere 7.

There is introduced between the spheres 1 and 7 a certain quantity of fluid 8 such as water. This operation can be conveniently performed by constructing the sphere 7 in the form of two half-spheres which are joined together after the sphere 1 has been placed inside one of said half-spheres, fluid being then introduced through an opening which is formed in the other half-sphere and which is subsequently plugged.

The sphere 1 floats in the fluid contained in the sphere 7 and the flat face 2 remains horizontal irrespective of the movement which is imparted to the complete assembly, this being achieved without any appreciable friction and without any inertia inasmuch as the ball 3 always tends to return to the lowermost point of the chamber 7 and is accompanied in its motion by the float 1. A further result thereby achieved is that the capillary forces which are exerted on the float 1 do not apply this latter against the chamber 7.

It is observed in addition that the magnetic compass which is constructed as hereinabove described is not liable to get out of order since the magnetized rod is not mounted on a pivot as is common practice but by means of the float is suspended and carried by the fluid and centered by a ball at its base. Finally, it is apparent that a compass of this type can be constructed in an extremely economical manner with plastic materials which are commonly employed in industry.

In the mode of construction which has just been described, the float and outer chamber are of spherical shape. However, it is obvious that the float in particular can have any shape which may be desired, the only condition being that the largest dimension of the float be smaller than the smallest dimension of the outer chamber, thereby ensuring that the float is permitted to move freely and without restriction into any position whatever with respect to the outer chamber.

The rugged design of the magnetic compass in accordance with the invention makes it suitable for use as a key-ring component, as a trinket, and so forth.

What I claim is:

1. A magnetic compass comprising:
   a housing having a chamber therein, said chamber being defined by a wall having at least a partially spherical surface;
   a quantity of fluid within the chamber;
   a float member within said chamber and having a curved surface buoyantly supported by said fluid for movement relative to said housing;

a magnetic member fixedly secured to one side of said float member;

means defining a recess in the side of said float member opposite said magnetic member; and a ball member freely received within said recess and projecting therefrom for rolling engagement with the spherical surface of said wall in said chamber, said recess being slightly larger than the diameter of said ball for closely confining same, whereby said ball tends to remain in the lowermost portion of the spherical surface due to gravity and the magnetic rod remains in a substantially horizontal position.

2. A magnetic compass comprising:

a transparent housing having wall means defining a spherical outer surface and a concentric spherical internal surface defining a chamber;

a quantity of liquid within the chamber;

a float member within said chamber and having a truncated spherical surface buoyantly supported by said liquid for movement relative to said housing, said float member having a flat circular surface thereon;

means defining a radially inwardly directed recess in the spherical outer surface of said float member diametrically opposite said flat surface;

a magnetic rod fixedly secured diametrically along the flat surface of said float member;

a guide ball freely received within said recess and projecting therefrom for rolling engagement with the spherical internal surface of said housing, said recess being slightly larger than said ball for closely confining and guiding same, said ball tending to remain in the lowermost portion of said spherical chamber due to gravity and the flat surface of the float member tending to remain in a substantially horizontal plane.

3. A magnetic compass according to claim 2, wherein said housing and said float member are each constructed of plastic, said float member having directional indicia on said spherical surface adjacent the edge of said flat surface.

References Cited

UNITED STATES PATENTS

| 390,115 | 9/1888 | Delany | 33—222 X |
| 2,260,396 | 10/1941 | Otto | 33—223 |
| 3,068,583 | 12/1962 | Goshen | 33—223 |

ROBERT B. HULL, *Primary Examiner.*